United States Patent
Williams et al.

(10) Patent No.: US 11,785,328 B2
(45) Date of Patent: Oct. 10, 2023

(54) SYSTEM AND CAMERA DEVICE FOR CAPTURING IMAGES

(71) Applicant: Sony Interactive Entertainment Inc., Tokyo (JP)

(72) Inventors: Nigel John Williams, London (GB); Fabio Cappello, London (GB); Rajeev Gupta, London (GB); Mark Jacobus Breugelmans, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 41 days.

(21) Appl. No.: 16/816,526

(22) Filed: Mar. 12, 2020

(65) Prior Publication Data

US 2020/0304707 A1  Sep. 24, 2020

(30) Foreign Application Priority Data

Mar. 19, 2019 (GB) .................................... 1903715

(51) Int. Cl.
*H04N 23/61* (2023.01)
*G06T 7/73* (2017.01)
(Continued)

(52) U.S. Cl.
CPC ............ *H04N 23/61* (2023.01); *G06N 20/00* (2019.01); *G06T 7/74* (2017.01); *G06T 7/80* (2017.01);
(Continued)

(58) Field of Classification Search
CPC .......... G06T 7/08; G06T 7/74; G06T 7/0004; G06T 7/73; G06T 2207/30244;
(Continued)

(56) References Cited

U.S. PATENT DOCUMENTS

2016/0127641 A1* 5/2016 Gove ................... H04N 23/651
348/143
2017/0220036 A1* 8/2017 Visser ................... H04R 29/004
(Continued)

FOREIGN PATENT DOCUMENTS

CN  107749952 A  *  3/2018
CN  107749952 A      3/2018
(Continued)

OTHER PUBLICATIONS

Shen, Qifeng, Linfeng Jiang, and Huilin Xiong. "Person tracking and frontal face capture with uav." 2018 IEEE 18th International Conference on Communication Technology (ICCT). IEEE, 2018. (Year: 2018).*
(Continued)

*Primary Examiner* — Vu Le
*Assistant Examiner* — Tracy Mangialaschi
(74) *Attorney, Agent, or Firm* — Matthew B. Dernier, Esq.

(57) ABSTRACT

A system for adjusting the pose of a camera relative to a subject in a scene is provided. The system comprises a camera operable to capture images of a scene; an identification unit configured to identify an object of interest in images of the scene; a pose processor configured to obtain a pose of the object of interest in the scene relative to the camera; a scene analyser operable to determine, based on at least one of the obtained pose of the object of interest and images captured by the camera, a scene quality associated with images captured by the camera. A controller is configured to cause the pose of the camera to be adjusted based on a determination that the scene quality of an image captured at a current pose is less than a threshold value. A corresponding device is also provided.

11 Claims, 2 Drawing Sheets

(51) Int. Cl.
*G06N 20/00* (2019.01)
*G06T 7/80* (2017.01)

(52) U.S. Cl.
CPC .............. *G06T 2207/20081* (2013.01); *G06T 2207/30244* (2013.01)

(58) Field of Classification Search
CPC . G06T 2207/10004; G06T 2207/30196; G06T 2207/20081; G06T 2207/30232; G06T 2207/30168; G06T 2207/20084; G06T 2200/21; G06T 7/80; G06N 3/006; G06N 3/0454; G06N 3/088; G06N 3/0445; G06N 3/0472; G06N 20/00; G06N 3/045; G06N 3/044; G06N 3/047; H04N 5/23219; H04N 5/23222; H04N 5/23218; H04N 23/61; H04N 23/611; H04N 23/64; B64C 2201/127; B64C 39/024; B64U 2101/30
See application file for complete search history.

(56) References Cited

U.S. PATENT DOCUMENTS

| | | | | |
|---|---|---|---|---|
| 2018/0262683 | A1* | 9/2018 | Meler | H04N 5/23238 |
| 2019/0043172 | A1* | 2/2019 | Chui | G06N 20/00 |
| 2019/0174056 | A1* | 6/2019 | Jung | H04N 5/23218 |
| 2020/0304707 | A1 | 9/2020 | Williams | |

FOREIGN PATENT DOCUMENTS

| | | |
|---|---|---|
| CN | 109144092 A | 1/2019 |
| EP | 3713217 A2 | 9/2020 |

OTHER PUBLICATIONS

Lin, Chyi-Yeu, and Chung-Yi Liang. "Innovative Drone Selfie System and Implementation." 2017 International Symposium on Computer Science and Intelligent Controls (ISCSIC). IEEE, 2017. (Year: 2017).*

Yu, Lingli, et al. "Intelligent land-vehicle model transfer trajectory planning method based on deep reinforcement learning." Sensors 18.9 (2018): 2905. (Year: 2018).*

Zamojc, Ian, "Unity 3D: Third Person Cameras" Tuts+ Code Tutorial, Jun. 21, 2012. (Year: 2012).*

Erdem, Ali Naci, and Ugur Halici. "Applying computational aesthetics to a video game application using machine learning." IEEE Computer Graphics and Applications 36.4 (2016): 23-33. (Year: 2016).*

Rawat, Yogesh Singh, and Mohan S. Kankanhalli. "Context-aware photography learning for smart mobile devices." ACM Transactions on Multimedia Computing, Communications, and Applications (TOMM) 12.1s (2015): 1-24. (Year: 2015).*

Combined Search and Examination Report for corresponding GB Application No. 1903715.9, 3 pages, dated Sep. 20, 2019.

Extended European Search Report for corresponding EP Application No. 20150461.0, 20 pages, dated Sep. 7, 2020.

Shen Qifeng, et al., "Person Tracking and Frontal Face Capture with UAV" 2018 18th International Conference on Communication Technology (ICCT) pp. 1412-1416, Oct. 8, 2018.

Lin Chyi-Yeu, et la., Innovative Drone Selfie System and Implementation 2017 International Symposium on Computer Science and Intelligent Controls (ISCSIC) pp. 135-140, Oct. 20, 2017.

Krishna Konda REddy, et al., "Camera Positioning for Global and Local Coverage Optimization" Distributed Smart Cameras (ICDSC) Sixth International Conference on IEEE, 6 pages, Oct. 30, 2012.

Y-C Hsieh, et a;l., "The Optimal Location of Surveillance Cameras on Straight Lanes" Expert Systems with Applications, vol. 38, No. 5, pp. 5416-5422, Nov. 10, 2010.

R. Shetty "Natural Language Description of Images and Videos" Master's Thesis, Aalto University, School Of Science, 95 pages, Sep. 8, 2016.

Communication Pursuant to Article 94(3) for corresponding EP Application No. 20150461.0, 8 pages, dated Feb. 17, 2022.

Zamojc Ian: "Unity3D: Third Person Cameras-Tuts+ Code Tutorial," URL:https://web.archive.org/web/20140303200332/https://code.tutsplus.com/tutorials/unity3d-third-person-cameras-mobile-11230, 14 pages, Mar. 3, 2014.

Examination Report for corresponding GB Application No. 1903715. 9, 5 pages, dated Dec. 22, 2021.

* cited by examiner

SYSTEM AND CAMERA DEVICE FOR CAPTURING IMAGES

BACKGROUND OF THE INVENTION

Field of the Invention

The present disclosure relates to a system for capturing images and a camera device.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent times, the accessibility of photography and videography has vastly improved. This has been fuelled at least in part by the proliferation of portable camera devices available on the market. These portable devices vary in form from smartphone devices, wearable cameras, professional cameras, drones incorporating cameras, etc.

Whilst the resolution of camera devices has continued to improve, the quality of the images captured by such cameras is largely dependent on the skills of the operator. For example, properties such as composition, occlusion of subjects, lighting, depth of field, etc. will usually depend on how the operator configures the camera relative to a subject in the scene. For scenes that include complex terrain or multiple dynamic subjects, positioning the camera to obtain the best image is not always straightforward.

Some camera devices, such as the Google® Clip camera, are trained to automatically detect events of interest occurring within a scene, and to capture images of those events. Whilst this is indeed useful, the quality of images captured in this way is still largely a function of where the operator points the camera. Moreover, these devices tend to be stationary and so offer somewhat limited coverage of dynamic scenes.

Camera devices that track objects of interest are known in the art. For example, so-called 'follow me' drones enable a user to be followed based on a detection of that user's location (using e.g. a GPS signal associated with that user, or computer vision). However, typically these drones maintain a pre-determined relative position to the user and do not response to any detected occlusion of the subject or a drop in the aesthetic quality of the images being captured.

Some video games provide a virtual camera for capturing images of a virtual scene, such as an in-game environment. The pose of this virtual camera is usually under control of a player, and therefore the quality of the captured images is dependent on the player's control over the virtual camera. In some games, the pose of the camera may be controlled using a pre-configured scripted path, e.g. to maintain a certain distance from a point on an avatar's body, like a virtual version of the drones described above.

However, generally, positioning the virtual camera in this way does not always result in an optimal image of the virtual scene being captured.

The present invention seeks to address or at least alleviate these problems.

SUMMARY OF THE INVENTION

According to a first aspect disclosed herein, there is provided and disclosed a system according to the details herein.

According to a second aspect disclosed herein, there is provided a device according to the details herein.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
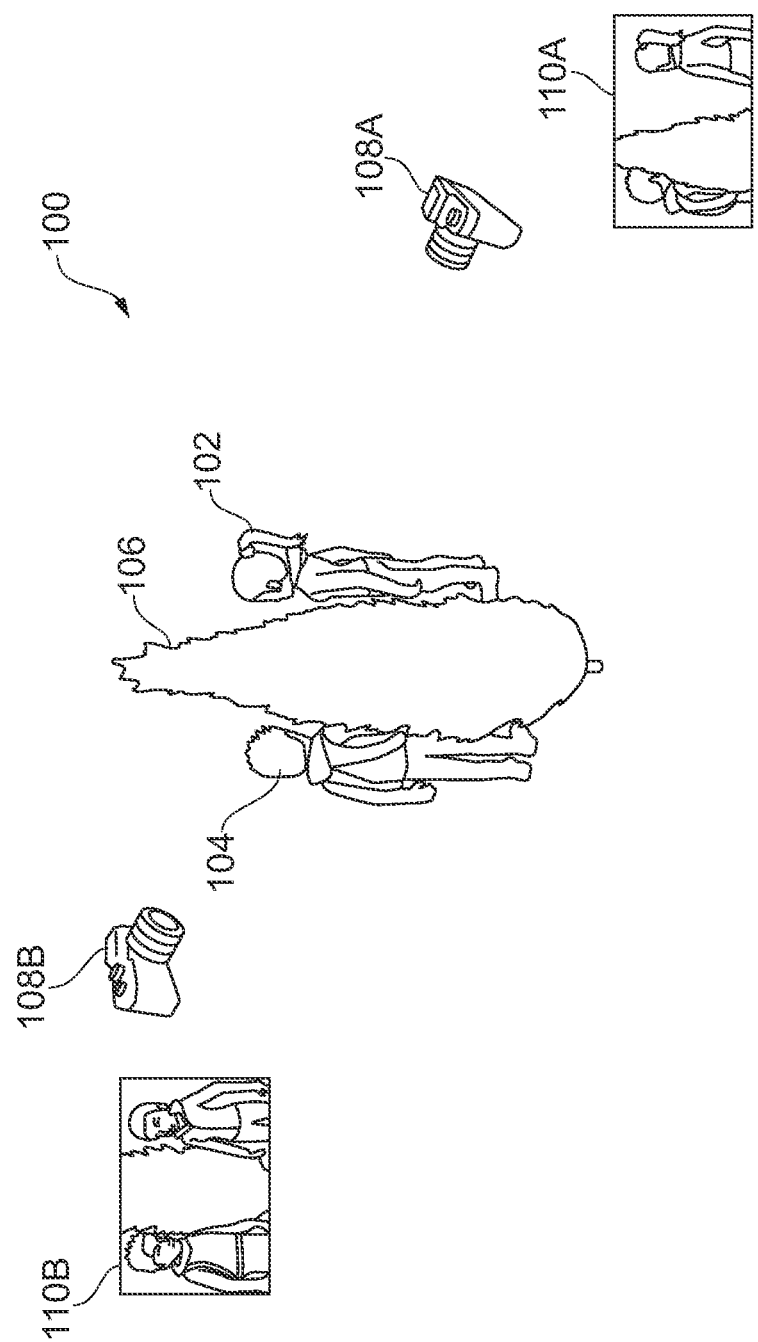
FIG. 1 shows an example of a scene comprising two subjects and a camera with different poses relative to the subjects.

Referring now to the drawings, wherein like reference numerals designate identical or corresponding parts throughout the several views, a system for capturing images and a camera device are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

A camera operator may wish to capture an image of scene for a variety of reasons. In some examples, the scene may correspond to a real, physical environment, and the user may wish to capture a still or video image of the environment. Usually, this will be for the purposes of capturing an image of one or more subjects in the scene. The subjects may correspond to e.g. people in the scene, the camera operator themselves (e.g. in the case of a selfie), specific objects within a scene, etc.

In some examples, the scene may be a virtual scene, such as a virtual environment rendered as part of a video game, and a user may wish to capture a still or video image of an in-game event using a virtual camera. For example, a player may wish to capture an image of their avatar within a video game.

FIG. 1 shows an example of a scene 100 comprising two subjects 102, 104. In FIG. 1 the subjects correspond to people, but may correspond to any items of interest. The scene comprises a further object, in this case, a tree 106. A camera is shown at a first position and orientation (i.e. pose) 110A relative to the subjects in the scene. The image captured by the camera at this pose is shown as a first image 110A. The camera is also shown at a second pose 110B relative to the subjects in the scene, and the corresponding image captured at that pose is shown as a second image 110B. The scene may correspond to a real, physical environment or a virtual environment, as described previously.

As can be seen in FIG. 1, the image captured at the first pose 110A would in most circumstances be considered sub-optimal since the second subject is partially occluded by the tree, and neither of the subjects' faces are forward facing in the captured image. It would be desirable if the position of the camera could be automatically adjusted to obtain an image of the scene in which at least one of the subjects is not occluded by any other objects in the scene (or at least occluded by an acceptable amount). Furthermore, it would be desirable if this image could be captured with an aesthetically pleasing composition, conforming with known artistic principles, such as e.g. the rule of thirds. A system for obtaining such images will now be described in relation to FIG. 2.

Figure 2:
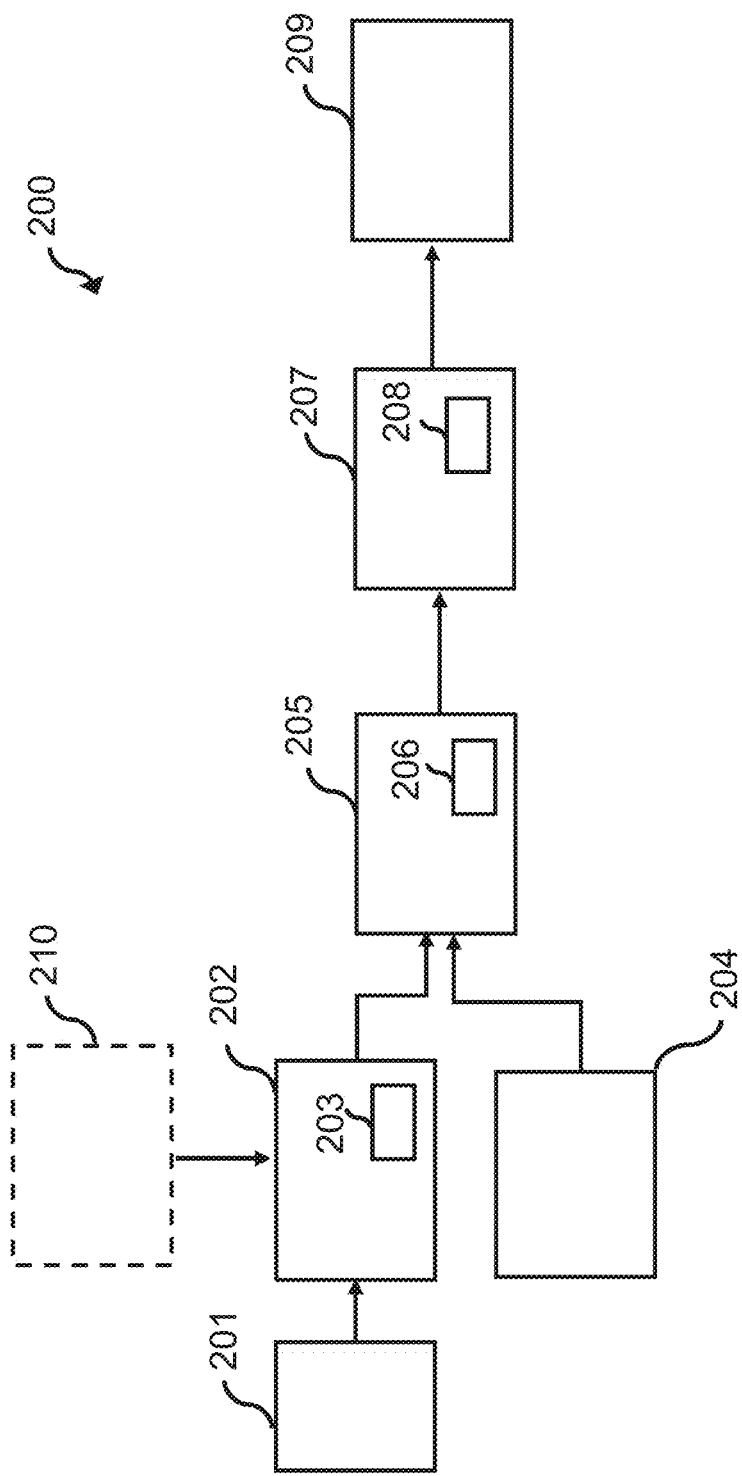
FIG. 2 shows schematically shows schematically an example of a system for capturing images of a scene.

FIG. 2 shows schematically an example of a system 200 for automatically adjusting the position of a camera 201 so as obtain an image of a subject in a scene.

The system 200 comprises a camera 201 operable to capture an image of the scene. The camera 201 may correspond to a real camera 201, comprising e.g. an image sensor and one or more lenses for focussing light onto the sensor. Alternatively, the camera 201 may correspond to a virtual camera 201, provided e.g. in a video game, that enables players to capture images of a virtual scene.

The system 200 also comprises an identification unit 202 configured to receive images captured by the camera 201 and to identify an object of interest in the scene. The identification unit 202 may use computer vision or machine learning techniques for performing this identification.

The identification unit 202 may also be configured to identify a type of scene that the captured image corresponds to. In some examples, this identification may be performed using a trained machine learning model (referred to herein as the scene type model 203). The scene type model 203 may be trained to learn the high-level features representative of different types of scene. This training may be achieved using images of different scenes which have been labelled with a respective scene identifier (i.e. supervised learning), or unlabelled images which have then been grouped into different scene types based on a similarity in content (i.e. using unsupervised learning). In the latter case, a developer may manually label the different groups with an identifier, indicating the scene type that the images in that group are representative of. In the former case, the images may be labelled in advance, e.g. with metadata indicating the scene type.

The high-level features may correspond to e.g. the composition, colour, intensity variation of an image (or a representation of those features) that have been learnt as corresponding to a scene-type. For example, in some embodiments, images may be input to a feature representation generator such as DenseNet, ResNet, MobileNet, etc, and the machine learning model may be trained to learn identifiers (representing scene-types) that correspond with the feature representations generated by DenseNet, ResNet, MobileNet, etc.

In some examples, the scene identifiers may correspond to metadata that the images used for training have been tagged with. For example, websites such as Instagram™, Flickr™, etc. allow users to tag images with identifiers (e.g. hashtags, geotags), indicating what those images are of, and so these tags can be used for training the scene type model, such that the scene type model can learn the high-level image features that correspond to the different tags. For video footage, websites such as e.g. YouTube™, Twitch™, etc. allow users to tag videos, and so the scene type model may be trained with video clips from these sites and their corresponding tags. In this way, the scene type model can learn an identifier that is associated with a given video clip (based on a similarity on to learnt, high-level features, for a given type of video clip).

Once the high-level features for different scenes have been learnt, the trained scene type model 203 may then identify which, if any, of those scene types a current image most likely corresponds to. Generally, it is useful for the type of scene that a camera 201 is capturing to be identified first, since the quality of the captured images will depend on this. For example, if a camera 201 operator is intending to capture e.g. actors in a scene, then the scene quality is likely to be higher if at least one of the actor's faces is visible in the scene.

It will be appreciated that images with which the scene type model 203 is trained may depend on how the camera 201 is to be used, and the types of scene that the camera 201 operator is likely to want to be able to have identified automatically. For example, if the camera 201 is to be used for filming actors in a scene, the scene type model 203 may be trained with film footage that is relevant to movies, or genres of movie that are relevant to the content being filmed. If the camera 201 is to be used for capturing dynamic scenes containing a lot of action, such as sporting activities, the scene type model 203 may be trained with images of such activities. Ultimately, the extent and nature with which the scene type model 203 is trained may depend on the intended use of the camera 201.

The system 200 further comprises a pose processor 204 configured to obtain a pose of an object of interest in the scene relative to the camera 201. Here, the term 'pose of the object' is used to describe a position and or orientation of the object in the scene, relative to the camera 201. The pose processor 204 may be arranged to receive or capture data from which the pose of the object relative to the camera 201 can be determined. For example, the pose processor 204 may be configured to receive images that have been marked up with pose data indicating a pose of an object in those images relative to the camera that captured them. Alternatively, or in addition, the pose processor 204 may be configured to determine a pose of the object in the scene, by processing the images captured by the camera. That is, the pose data may correspond to abstracted image data. Generally, the pose processor 204 is configured to obtain pose data indicating at least one of a direction of the object of interest relative to the camera and the distance of the object of interest relative to the camera.

In some examples, the object of interest may correspond to a person and the 3D pose of the person may be approximated based on data (e.g. GPS and or gyroscope data) received from an electronic device that is being held or worn by the person. For example, in sports matches such as rugby, players may be wearing a sensor that tracks their position (and possibly orientation) on the pitch, and this data may be provided as an input to the pose processor. If the pose of the camera is known (i.e. tracked), the pose of the players relative to the camera can be determined. Alternatively, the pose of the players relative to the camera can be determined using known calibration techniques; for example, if the camera intrinsics are known, and the pose of the players in the 3D scene is known, the position and orientation of the camera relative to the subject can be determined.

In some examples, it may be that the pose of subjects in the scene are not tracked using e.g. sensors. In such examples, the pose of subjects in the scene may be determined using e.g. facial and or skeletal tracking to detect a position and or orientation of the subjects in the scene relative to the camera. The position and or orientation of the subjects relative to the camera may also be determined using information about the known e.g. size and shape of standard objects (e.g. humans) at pre-determined distances and orientations from the camera. This may be applicable where, for example, the camera is fixed and the subjects, such as players in a sports match, are relatively far away from the camera (e.g. video captured by a so-called 'spidercam').

If there are multiple cameras, the position and orientation of the cameras relative to the subject(s) may be determined using feature tracking. For example, if common features are detected in the images captured by multiple cameras, the pose of the cameras relative to the subject can be determined.

In examples where the object of interest corresponds to a virtual object in a virtual scene (e.g. in a video game), the pose processor 204 may be configured to simply receive pose data indicating a pose of the virtual object in the virtual scene.

It will be appreciated that any suitable method for determining the position and or orientation of a subject in the 3D scene relative to a camera 201 may be used.

Returning to FIG. 2, the system 200 also comprises a scene analyser 205 operable to determine a scene quality associated with images captured by the camera. The scene analyser 205 is configured to determine the scene quality based on one or more of: pose data indicating a pose of the object of interest in the scene relative to the camera (obtained as described above), the images captured by the camera at a given pose, and abstracted image data (e.g. low pass filtered, low resolution and or monochrome images). These form of inputs to the scene analyser may be separate (i.e. independent) or combined, as appropriate.

The scene analyser 205 may comprise a machine learning model that has been trained to map any one of these inputs to a corresponding scene quality (i.e. value or parameter), indicating the likelihood that an image of a subject, captured from a current pose of the camera, is likely to be viewed as aesthetically pleasing by a viewer. In the embodiments described herein, this model is referred to as the scene quality model 206.

The scene quality model 206 may be trained with pose data and/or image data and/or abstracted image data, and a scene quality associated with that data. The scene quality associated with that data may be inferred from the source of the pose, image and/or abstracted image data (i.e. being professionally captured or popular), as will be described below.

In some examples, the scene quality model 206 is trained to determine a scene quality associated with a captured image based on at least one of:
   a direction of the subject with respect to the camera (e.g. will the subject's face be visible)
   a distance of the subject from the camera (e.g. will the subject's face be resolvable)
   an occlusion of the subject in the captured image (e.g. what percentage of the subject is occluded, and of that, what percentage of a critical region, such as the subject's face, is occluded)
   a position within/occupancy of the image of the subject (for aesthetics, e.g. rule of thirds or genre specific rules)

The scene quality model 206 may be trained with at least some of this information, as obtained for a plurality of training images for which the associated scene quality is known. In this way, the scene quality model 206 is trained to learn a relationship between one or more of the subject direction, distance, occlusion, position/occupancy, and the associated scene quality.

It will be appreciated that, in some situations, there may be multiple subjects in the training images, and so the scene quality model may be trained with the direction, distance, occlusion, and/or image occupancy for each of those subjects, along with the scene quality associated with the training images featuring those subjects.

The occlusion of the subject may be determined by performing e.g. skeletal and facial tracking and determining what percentage of a detected face or skeleton in a captured image is obscured relative to a reference face or skeleton that the subject is known to correspond to. The face of a subject may be identified as a critical region, and an occlusion associated with a captured image may be determined as higher if this critical region is occluded by more than a threshold amount. The occlusion associated with a plurality of training images, and the scene quality associated with those images may be used to train the scene quality model 206.

It will be appreciated that, in some examples, it may be desirable for a subject not to be forward facing, and so the scene quality model may be trained with both the identified scene type, and an occlusion associated with images captured for that scene type. The scene quality associated with a given occlusion, for a given image, can be inferred from the source or popularity associated with the images from which the occlusion has been determined. For example, occlusion information obtained from professionally captured images may automatically be labelled as being associated with a high scene quality. In this way, the scene quality model 206 can be trained to learn a relationship between the occlusion associated with a subject in an image, and a scene quality associated with that image.

The subject position within/occupancy of the captured image may be determined by processing the images captured by the camera. For example, an object of interest within a captured image may be identified (e.g. via the identification unit), and the position of that object relative to other objects/features in the captured image may be determined. In a simple example, this may involve determining whether an object of interest is approximately position ⅓ or ⅔ along the horizontal axis.

As will be appreciated, the 'desirable' position for a subject in a scene will usually depend on the type of scene being captured, and so the scene quality model may be trained with both the scene type (e.g. as an identifier) and the position of subjects within images for that scene type. In some examples, the identification unit may be configured to identify the relative positions/occupancy of subject(s) in images, and this information may be provided as an input to the scene quality model, along with a scene quality associated with the images from which the relative positions/occupancy of the subject(s) in the images were obtained. Again, the scene quality associated with the position/occupancy of the subject(s) in the image may be identified as high if the position/occupancy of the subject(s) have been obtained from professionally captured and or popular content. In this way, the scene quality model 206 can be trained to learn, for a given scene type, a relationship between the position/occupancy of the subject in the image and the associated scene quality.

In some examples, the scene quality model may be trained with pose data that has been captured during the recording of a live event. For example, during a broadcast event, such as a sports match (e.g. football, basketball, rugby, ice hockey, etc.), the position of players on the pitch may be tracked, and the pose of the camera may also be tracked (or obtained based on e.g. known geometry of the venue and the known positions of the players). This pose data may be input to the scene quality model, and may be labelled as corresponding to a high scene quality, since it corresponds to content that has been captured in a professional manner. In this way, the scene quality model is able to learn what pose of the camera relative to the players corresponds to a high scene quality.

In some examples, pose data obtained from video game footage may be used for training the scene quality model. In such examples, the pose of the virtual camera relative to a virtual object (e.g. a player's avatar) may be known exactly, and this pose data may be used for training the scene quality model. The scene quality associated with this pose data may be identified as high if e.g. it corresponds to video footage captured by a popular content creator or has a high popularity associated therewith (e.g. large number of online 'views' or 'likes'). By training the scene quality model 206 with this data, the scene quality model 206 can learn what poses of the virtual camera relative to a virtual object is likely to result in the capture of an image having a high scene quality. Again, the scene quality model may need to be trained with the scene type associated with the virtual camera pose data, to ensure that the relationship between virtual camera pose (relative to subject) and scene-quality is learnt on a per-scene-type (i.e. per game genre) basis.

In some examples, the scene quality model 206 may be further trained with training images of different objects of interest in different scenes. That is, images may be provided as an input to the scene quality model, as opposed to e.g. pose, occlusion and composition information that has been extracted from those images. In this way, the scene quality model may be trained to implicitly learn the image features (e.g. lighting, occlusion, composition, etc.) that correspond to images of high scene qualities. As above, a high-scene quality may be inferable from the source of training images—e.g. if they correspond to professionally captured content, or content that is known to be popular. For example, images taken from e.g. Instagram™, Flickr™, 500Px™, YouTube™, etc. may be known to be of a high scene quality if they have a large number of 'likes' or 'views' associated therewith. Training images may be labelled as having a high scene quality based on at least one of their source, associated popularity (e.g. likes or views exceeding a threshold value) and creator.

It will be appreciated that there may be variability in the quality of the training images used for training the scene quality model 206. For example, broadcast sports footage is likely to be of superior quality to footage taken from e.g. YouTube™. To compensate for this, the training images may be converted into a standard format, using for example, an external system, such as e.g. CycleGAN.

By training the scene quality model with this data, the scene quality model can learn, for a given scene type, the high-level image features (colour, composition, lighting, etc.) that are common to images of a high scene quality. Once trained, the scene quality model can then determine whether a current captured image, for a given scene type, is of a high scene quality.

The system 200 further comprises a controller 207 configured to receive an input from the scene analyser 205 and in response thereto, adjust a pose of the camera 201. The input provides an indication of whether the scene quality associated with a current image is less than a threshold value.

In embodiments where the camera 201 is a real camera 201, the controller 207 may be configured to generate a signal for receipt by a motion means 209, such as a motor of a device in which the camera 201 is incorporated or attached to. The motion means 209 is operable to control at least one of a translation and rotation of the camera 201. In some examples, the camera 201 may be incorporated into a device that includes wheels and or propellers (e.g. a drone), and the controller 207 may be configured to control a power that is applied to the wheels and or propellers (as well as any steering means associated therewith). In embodiments where the camera 201 is a virtual camera 201, the controller 207 may simply determine a new pose within the virtual scene that the virtual camera 201 is to be moved to.

Alternatively, if the camera is a hand-held camera, then instead of the controller causing a pose of the camera to be adjusted by controlling a motor, the controller may cause a pose of the camera to be adjusted by controlling a guidance interface on the camera, such as for example a graphic of an arrow pointing in the desired movement direction on the rear screen of the camera (and/or in a viewfinder), optionally with an indication of desired distance in the indicated direction, such as a number or line that reduces as the user moves the camera to the ideal position.

In some examples, the controller 207 comprises a machine learning model (herein referred to as the pose model 208) that is trained to determine a pose of the camera 201 that is more likely to result in the capture of an image of an object of interest, with a higher scene quality. The pose model 208 may comprise an agent trained using deep reinforcement learning. For example, the agent may be trained by moving randomly or stochastically around a scene, to learn a pose that results in a maximal overall scene quality of a subject in the scene. That is, the reward function may correspond to the average scene quality over time. The scene quality of the captured images may be determined using the scene quality model 206, as described previously.

In preferred examples, the agent is trained by moving around a virtual scene comprising a virtual subject (this is preferred since movement of the camera about the subject will be easier to achieve). The virtual scene may be provided by a game engine, for example, and may correspond to a real scene that a real camera is to be deployed at. For each pose of the virtual camera relative to the subject in the virtual scene, the scene quality associated with that pose may be determined using the trained scene quality model 206, and the agent may be trained to learn a new pose that is likely to result in the capture of images with a higher associated scene quality. In some examples, the virtual scene may comprise multiple virtual subjects, and the scene quality model may be configured to determine a scene quality based on the poses of those subjects, relative to the camera.

In one example, the inputs to the pose model 208 may include the position and or orientation of the virtual camera, the position and or orientation of the virtual subject, and the output of the scene quality model 206. The pose model may be trained with these inputs so as to learn (via deep reinforcement learning) a pose of the virtual camera relative to the virtual subject that maximises the average scene quality.

The agent may be trained by moving around multiple different scenes and capturing images of different objects of interest within those scenes. Once the agent has been trained for a sufficient number of different scene types and different subjects, the pose model 208 may be used to adjust the position of the camera 201. The pose model may also be trained to learn one or more camera parameters that result in images of a higher scene quality being captured, as will be described later.

In some examples, the object of interest (i.e. subject) may comprise a human character. In such examples, the scene quality model 206 may be trained with pose and or image data relating to human characters. In these examples the pose model may be trained to adjust the pose of the camera to ensure that less of a human subject's face is occluded (e.g. is more forward facing).

As will be appreciated, for human subjects, the identification unit 202 may be configured to detect the human subject in the scene (using e.g. image segmentation, facial recognition, etc.) and to provide this as an input to scene quality model 206, so that the scene analyser 205 can employ an appropriately trained model (i.e. with images of human subjects in corresponding scenes) to determine the scene quality of the captured images.

Generally, for scenes including plural human characters, there will be one or more primary characters and one or more secondary characters. If the camera 201 operator is filming actors in a scene, the primary character may correspond to a character that is speaking or performing a pre-determined action. Usually, it is desirable that the camera 201 is focussed on the primary character, and so the captured images of the scene should include more of the primary actor than the second actor. Moreover, it will usually be desirable that the face of the primary actor is not occluded.

Therefore, in some examples, the scene quality model 206 may be trained with pose and or image data relating to plural characters, wherein one or more of the characters in the image have been identified as primary characters. I Image data and or pose data corresponding to the primary character being visible in a captured image (and/or occluded less than a threshold amount) may be labelled as having a high scene quality such that the scene quality model 206 is trained to learn that images featuring the primary character are of a higher quality than those in which the primary character is not visible. Hence, the controller 207 may be trained to determine a pose of the camera 201 that is more likely to result in an image of the scene in which the primary character's face is not occluded, or at least appears in a manner appropriate to the type of scene that the camera 201 operator is intending to capture.

In some examples, the user may provide an input indicating which of the characters are primary characters, and the scene quality model 206 (having been sufficiently trained) may determine a scene quality of the scene based on this identification. This identification may be performed using e.g. a touchscreen on which a video being captured by the camera 201 is being displayed, and the user may select a region of the touchscreen corresponding to the primary character(s) in the scene. More generally, the identification unit 202 may be operable to receive an input, indicating one or more primary characters within the scene.

In some examples, the detection of primary characters in the scene may be performed automatically. For example, the system 200 may comprise one or more microphones for detecting a character's speech, and the character may be identified as a primary character in the scene, based on the detection of that character's speech. Alternatively, or in addition, the times at which different characters within the scene are set to speak may be known in advance, based e.g. on a script, and this information may be provided to the identification unit 202, to identify different characters for which the camera's focus should be on, whilst filming the scene. Generally, the system may comprise an audio unit (not shown) operable to receive speech data indicative that at least one of the characters is or is about to start speaking, and this information may be provided to the identification unit 202, which then determines which of the characters corresponds to a primary character.

In some scenarios, it may be that there are plural primary characters or at least two characters that the character intends to capture with the camera 201. In such examples, the at least two characters may be identified for inclusion in the captured image (via any of the means described above), and the scene quality model 206 may be configured to determine a scene quality associated with the captured images, based on the identification of plural characters within the scene. Again, the scene quality model 206 may be trained with pose data and or image data pertaining to multiple primary characters, and the scene quality may be higher for images in which the faces of the primary characters are visible. In this way, the controller 207 may be configured to determine a pose of the camera 201 that results in minimal occlusion of the faces of the plural primary characters.

In some examples, the camera 201 operator may wish to include other objects of interest in the captured images (i.e. besides people). In such examples, the identification unit 202 may be configured to receive an input, indicating one or more objects of interest for inclusion in the captured images. This input may be provided to the scene quality model 206, which then determines a scene quality of the captured images based on the identified objects, the pose of those objects relative to the camera 201 and/or the captured images of the scene.

Objects may be identified for inclusion in the captured image by way of a user input. For example, a video image being captured by the camera 201 may be displayed at a screen and a user may select a region of the screen corresponding to the object of interest that they intend to include in the captured images. The identification of the objects may be somewhat automatic in that machine learning or computer vision techniques may be used to identify different objects in the scene, with the operator providing a manual input as to which of the identified objects are of a higher priority for inclusion in the captured images.

In some examples, the operator may wish to maximize the number of, or amount of, certain objects of interest within the captured images. For example, in horror movies, it is typical to a show a character surrounded by trees, to invoke fear. Thus, the camera 201 operator may provide an input indicating that the number of trees in the captured image is to be maximized. This may involve, for example, selecting e.g. 'tree' as the object of interest in a displayed image, and providing a further input that the number of trees in the captured image is to be maximized. These inputs may be provided to the scene quality model 206, which then determines a scene quality of the captured images based on the number of identified objects of interest in a captured image, any identified characters, the captured images and/or the pose of any identified characters relative to the camera 201. As will be appreciated, generally the scene quality will be higher for images in which an identified character is visible and so this ensures that the camera 201 is not moved to a position as far away as possible when trying to maximize the number of e.g. trees in a captured shot.

For some content, it may be desirable to adjust the position of the camera 201 based on the location of an audio source within a scene (which is not necessarily associated with a human character). Hence in some examples, the system 200 may comprise two or more microphones for detecting an audio source in the scene. The identification unit 202 may be configured to receive the audio signal detected by the microphones, and in response thereto, identify a known source of audio that the detected audio signal corresponds to. This may be achieved using e.g. machine learning, or by simply comparing the spectral characteristics of the audio signal to those of a plurality of known audio sources. The pose processor 204 may be configured to determine a 3D pose of the audio source relative to the microphones, based on the audio signal detected by the two or more microphones. In preferred examples, the two or more microphones are associated with a device that comprises the camera 201, and so the pose of the audio source relative to the camera 201 can be inferred from the audio signal detected by the microphones.

The scene quality model 206 may be configured to receive an indication of the identified audio source (i.e. type) and the 3D pose of the audio source relative to the camera, and in response thereto, determine a scene quality associated with the captured images. This may be in addition to any other objects of interest, such as human characters, that have been identified as objects of interest by the identification unit 202. As will be appreciated, in such examples, the scene quality model 206 will have been further trained with data indicating different types of audio sources in a scene, and pose data indicating at least one of the position and orientation of the audio sources, relative to the camera 201 used to for capturing the subject(s) in a scene.

In this way, the scene quality model 206 can further determine the scene quality associated with the captured images based on the pose data and or image data associated with the image subject, and the pose of a source of audio relative to the camera 201.

In one example, the scene quality model 206 may be trained with the frames of a video in which characters are running from an explosion, and the scene quality model 206 may learn the poses of the camera 201 that should be adopted when filming such a scenario (based on e.g. the poses of the actors relative to the camera, the captured images, and the location of explosion).

In some examples, the scene may be a virtual scene and so the type of audio sources and their relative location within the scene may be known exactly. Moreover, the timings at which different audio sources are to generate audio may also be known. Hence, the type of audio, the relative location, and optionally, timing information may be input to the scene quality model 206. The scene quality model 206 may then determine a scene quality associated with a currently captured image of the virtual scene, based on e.g. the captured image, location of e.g. a player's avatar and any sources of audio in the scene. Again, in such examples, the scene quality model 206 may have been trained with training images (e.g. video frames) and/or the 3D poses of e.g. a player's avatar, and the relative location of any audio sources in the scene. As will be appreciated, in some video games, there may be multiple audio sources, and so the identification unit 202 may be operable to detect audio sources that will contribute most to the player's experience (e.g. loudest and or closest sources of audio).

In some examples, the scene quality model 206 may be further trained with intrinsic camera data, indicating the one or more camera parameters that were used to capture images of the subject(s).). The intrinsic data may include, for example, the focal length, aperture, shutter speed, any special modes (e.g. HDR), of the camera(s) used in capturing the training images. If, for example, images of a real scene, captured by a real camera, are used for training the scene quality model, then the intrinsic camera data may be encoded with the captured images as metadata. In this way, the scene quality model 206 can be trained to determine a relationship between the relative pose of the subject(s) with respect to the camera, (optionally, the captured image data) one or more camera parameters, and a corresponding scene quality.

In these examples (where intrinsic parameters are taken into account), the controller 207 may be further configured to adjust one or more intrinsic parameters of the camera 201 based on a determination that the scene quality of a current image is less than a threshold value. For example, the controller 207 may be configured to adjust a focal length of the camera 201 (i.e. zoom), aperture, shutter speed, etc. based on the determined scene quality. The adjustment to these parameters may be determined based on the determined scene quality output by the scene quality model 206.

As described previously, the controller 207 may comprise a pose model 208 trained to determine an adjustment to the pose of the camera 201. In examples where one or more camera parameters are also adjusted, the pose model may be further trained to determine one or more camera parameters for maximizing the scene quality. This may involve, for example, using deep reinforcement learning to train an agent to capture multiple images of a subject in a virtual scene, and to learn the combination of camera parameters that result in the captured images having a highest scene quality (for a given location). The scene quality of the images captured during this training may be determined using the trained scene quality model 206 (i.e. by determining how close those images correspond to image of corresponding subjects in corresponding scenes, for which the scene quality is known to be high).

In additional or alternative examples, the controller may be configured to adjust e.g. the depth of field based on the pose that the camera has been moved to. For example, if the camera has been moved to a position that is less than a threshold distance from the subject, the controller may determine that the subject of the image should be in focus, with the background blurred. Conversely, if it is determined that the subject in the image is more than a threshold distance from the adjusted pose of the camera, the controller may be configured to control e.g. the aperture of the camera, to ensure that all, or a majority of, the scene is in focus.

Whilst the above examples have been described as separate units within a system, it will be appreciated that one or more of these may included in the same device, with the device itself making up a camera device. The camera device may correspond to a physical device having a controllable position and orientation. For example, the camera device may correspond to a camera device having powered wheels or propellers (e.g. a drone). In examples where all of the components are incorporated into the same physical device, it may be that the various machine learning models are trained using e.g. one or more severs (e.g. the cloud), with the trained machine learning models being exported to the relevant modules of the physical camera device.

Thus, in some embodiments, there is provided a system in which a real camera device comprises: a sensor operable to capture images of a scene and also one or more selected from the list consisting of an identification unit (e.g operable to identify an object of interest in the captured images); a pose processor (e.g. operable to obtain a pose of the object of interest in the scene relative to the camera); a scene analyser (e.g. configured to detect a scene quality associated with the images captured by the camera, the scene analyser comprising a machine learning model trained to determine a scene quality associated with captured images); and a controller (e.g. operable to control a pose of the camera device, based on a determination that the scene quality of a current image is less than a threshold value).

It will be appreciated that the machine learning models described herein may comprise at least one of a trained neural network, such as a trained convolutional or recursive neural network (CNN, RNN respectively), a multilayer perceptron (MLP), or restricted Boltzmann machine, for example. Ultimately, any suitable machine learning system may be used.

It will be further appreciated that in some examples, the camera need not capture an image for the scene quality to be determined. For example, in some examples, the scene quality may be determined based solely on the pose of the subject relative to the camera, which not actually require the capturing of any images (e.g. if position of subject and camera is being tracked during a broadcast event).

It will be further appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system comprising:
a non-transitory, computer readable storage medium having stored thereon a computer program comprising processor-implementable instructions; and a computer processor, which when executing the computer program, causes the system to implement:
a virtual camera operable to capture images of a scene;
an identification unit configured to identify an object of interest in images of the scene;
a pose processor configured to obtain a pose of the object of interest in the scene relative to the virtual camera;
a scene analyser operable to determine, based on at least one of the obtained pose of the object of interest and images captured by the virtual camera, a scene quality associated with images captured by the virtual camera at a respective pose; wherein the scene analyser comprises a first machine learning model trained to determine the scene quality associated with the images captured by the virtual camera at respective poses, where the first machine learning model is trained to recognize poses of high scene quality through analysis of images of high popularity in a user community; and
a controller configured to cause a pose of the virtual camera to be adjusted based on a determination that the scene quality of an image captured at a current pose is less than a threshold value, wherein:
the identification unit is configured to identify a type of scene that the images captured by the virtual camera corresponds to,
the scene analyser is further configured to determine a scene quality associated with the images captured by the virtual camera at a respective pose, based on the identified scene type,
the identification unit comprises a third machine learning model trained to identify a type of scene that the images captured by the virtual camera corresponds to, and
the third machine learning model is trained with images of different types of scene and corresponding scene identifiers.

2. A system according to claim 1, wherein the first machine learning model is trained with pose data indicating a pose of the object of interest in the scene relative to the virtual camera that captured the images and or training images of objects of interest wherein the pose data and or training images are labelled with respective scene qualities.

3. A system according to claim 2, wherein the pose data and or training images are labelled as having a high scene quality based on at least one of a source of the pose data and or training images and user feedback associated with the pose data and or training images.

4. A system according to claim 1, wherein the controller comprises a second machine learning model trained to determine a pose of the virtual camera that is likely to result in the capture of an image of the object of interest having a higher scene quality.

5. A system according to claim 4,
wherein the second machine learning model comprises an agent trained using deep reinforcement learning; and
wherein the agent is trained to learn a pose that maximises the scene quality of images captured by the virtual camera, the agent being trained by moving around multiple different virtual scenes and capturing virtual images of objects of interest within those scenes.

6. A system according to claim 5, wherein the second machine learning model is configured to determine a scene quality associated with the virtual images by inputting the virtual images into the first trained machine learning model.

7. A system according to claim 1,
wherein the object of interest comprises a character in a scene, and
wherein the scene quality model is trained with pose data and or training images of characters in scenes.

8. A system according to claim 7, wherein
the object of interest comprises a plurality of characters,
the system includes an input unit operable to receive an input from a user indicating one or more characters that are to be included in the captured images; and
the scene analyser is configured to determine a scene quality based on the 3D poses of the characters that are to be included in the captured images and or the images captured by the virtual camera.

9. A system according to claim 8, comprising:
an audio unit operable to receive speech data indicative that at least one of the characters is or is about to start speaking;
wherein the identification unit is configured to identify, based on the speech data, at least one of the characters as a primary character; and wherein the scene analyser is configured to detect the scene quality based on the pose of the at least one primary character in the scene relative to the virtual camera and or the images captured by the virtual camera.

10. A system according to claim 1, wherein the identification unit is configured to identify a source of audio in the scene and the pose processor is configured to determine a pose of the source of audio relative to the virtual camera; and wherein the scene analyser is further configured to determine a scene quality associated with the captured images, based on the detected pose of the source of audio relative to the virtual camera.

11. A system according to claim 1, wherein the virtual camera is operable to capture images of a virtual scene.

* * * * *